(12) United States Patent
Bluethmann et al.

(10) Patent No.: US 9,102,331 B2
(45) Date of Patent: Aug. 11, 2015

(54) MULTI-FUNCTIONAL ELECTRIC MODULE FOR A VEHICLE

(71) Applicants: GM GLOBAL TECHNOLOGY OPERATIONS LLC, Detroit, MI (US); The United States of America As Represented by the Administrator of the National Aeronautics and Space Administration, Washington, DC (US)

(72) Inventors: William J. Bluethmann, Houston, TX (US); Thomas M. Waligora, Houston, TX (US); Nathan Fraser-Chanpong, Houston, TX (US); Ryan Reed, Houston, TX (US); Akinjide Akinniyi Akinyode, Houston, TX (US); Ivan Spain, Pearland, TX (US); Andrew D. Dawson, League City, TX (US); Joshua M. Figuered, Houston, TX (US); Eduardo Herrera, Houston, TX (US); Mason M. Markee, Houston, TX (US); Robert L. Vitale, Macomb Township, MI (US); Chunhao J. Lee, Troy, MI (US); Lucien Q. Junkin, Houston, TX (US); Ross Briant Winn, Houston, TX (US); James Jonathan Rogers, League City, TX (US); Raymond Guo, Seabrook, TX (US)

(73) Assignees: GM Global Technology Operations LLC, Detroit, MI (US); The United States of America As Represented by the Administrator of the National Aeronautics and Space Administration, Washington, DC (US)

( * ) Notice: Subject to any disclaimer, the term of this patent is extended or adjusted under 35 U.S.C. 154(b) by 147 days.

(21) Appl. No.: 14/032,470

(22) Filed: Sep. 20, 2013

(65) Prior Publication Data
US 2015/0083508 A1     Mar. 26, 2015

(51) Int. Cl.
*B60K 1/00*     (2006.01)
*B60W 30/18*    (2012.01)
(Continued)

(52) U.S. Cl.
CPC ........ *B60W 30/18009* (2013.01); *B60K 7/0007* (2013.01); *B60T 13/74* (2013.01);
(Continued)

(58) Field of Classification Search
CPC ...... B60K 1/00; B60K 7/00; B60W 30/18009
See application file for complete search history.

(56) References Cited

U.S. PATENT DOCUMENTS 7,398,846 B2     7/2008  Young et al.

OTHER PUBLICATIONS

Green Car Congress, Energy, Technologies, issues and policies for sustainable mobility; Apr. 26, 2013, 2004-2013 Green Car Congress.

*Primary Examiner* — Kevin Hurley
*Assistant Examiner* — Gabriela C Craciun
(74) *Attorney, Agent, or Firm* — Quinn Law Group, PLLC

(57) ABSTRACT

A multi-functional electric module (eModule) is provided for a vehicle having a chassis, a master controller, and a drive wheel having a propulsion-braking module. The eModule includes a steering control assembly, mounting bracket, propulsion control assembly, brake controller, housing, and control arm. The steering control assembly includes a steering motor controlled by steering controllers in response to control signals from the master controller. A mounting feature of the bracket connects to the chassis. The propulsion control assembly and brake controller are in communication with the propulsion-braking module. The control arm connects to the lower portion and contains elements of a suspension system, with the control arm being connectable to the drive wheel via a wheel input/output block. The controllers are responsive to the master controller to control a respective steering, propulsion, and braking function. The steering motor may have a dual-wound stator with windings controlled via the respective steering controllers.

19 Claims, 8 Drawing Sheets

(51) Int. Cl.
  *B60K 7/00*   (2006.01)
  *B60T 13/74*  (2006.01)
  *B62D 5/04*   (2006.01)
  *B60W 10/08*  (2006.01)
  *B60W 10/192* (2012.01)
  *B60W 10/20*  (2006.01)

(52) U.S. Cl.
  CPC ............ *B60W 10/08* (2013.01); *B60W 10/192* (2013.01); *B60W 10/20* (2013.01); *B62D 5/0418* (2013.01); *B60K 2007/0038* (2013.01)

MULTI-FUNCTIONAL ELECTRIC MODULE FOR A VEHICLE

STATEMENT REGARDING FEDERALLY SPONSORED RESEARCH OR DEVELOPMENT

This invention was made with government support under NASA Space Act Agreement number SAA-EA-10-017. The invention described herein may be manufactured and used by or for the U.S. Government for U.S. Government (i.e., non-commercial) purposes without the payment of royalties thereon or therefor.

TECHNICAL FIELD

The present disclosure is related to a multi-functional electric module for a vehicle.

BACKGROUND

An ideal vehicle design for a driver who is commuting within a congested area might be a vehicle that is easy to maneuver and park in limited space. A conventional vehicle having a fuel efficient engine and a fixed powertrain configuration, i.e., a powertrain having mechanically coupled steering, braking, and propulsion systems, may be the vehicle of choice for such a driver. However, the fixed nature of a conventional powertrain may be less than optimal in these circumstances, particularly in terms of operating mode flexibility.

SUMMARY

A multi-functional electric module or "eModule" is disclosed herein. The eModule may be used to independently suspend, propel, steer, and brake a corresponding corner or other portion of a vehicle. Distribution of these core vehicle functions to the corners or perimeter of a vehicle may free up some of the space and weight of a conventional centralized powertrain. Additionally, the eModules described herein may be controlled by-wire, and thus lack direct mechanical linkages between a steering wheel, pedals, and other driver input devices and the actuators used for accomplishing a desired steering, propulsion, or braking action. Moreover, the functional capabilities of the individual eModules collectively enable the coordinated control of the vehicle through a variety of different user-selectable operating modes, including some operating modes that are not possible using conventional front wheel-steered vehicles.

Each eModule may contain multiple embedded local controllers in communication with a master controller. As used herein, the term "embedded" refers to the physical location of the controller within the structure of a corresponding eModule, and the term "local" refers to the limits of the scope of all control actions effectuated by a respective controller. The term "master" refers to the hierarchical level of control of the master controller relative to the multiple embedded local controllers. Each embedded local controller is assigned a corresponding functional task for a given drive wheel, i.e., steering, propulsion, or braking. The master controller communicates with the embedded local controllers, with the local controllers being daisy chained together in an embodiment, and with the master controller providing all top-level commands to the local controllers as well as task arbitration between the corner modules.

Multiple steering controllers may be used in conjunction with a dual-wound stator in a steering motor assembly to provide functional redundancy to the steering function. Independent control of each eModule may be supervised by the master controller, which in turn may be backed by a redundant secondary master controller, with the various controllers communicating as needed with the master controller/secondary master controller via Ethernet for Control Automation Technology (EtherCAT), controller area network (CAN) bus, or another suitable high-speed network connection.

Driver input commands from various input devices, for instance a steering wheel and/or joystick, a brake pedal, an accelerator pedal, and a human machine interface (HMI) screen, are transmitted by-wire and received by the master controller. The master controller, upon receipt and processing of the by-wire input commands, issues individual by-wire commands to each of the embedded local controllers. Thus, the entire control operation is achieved by-wire as noted above, i.e., without a direct mechanical linkage between the driver input devices and the steering, propulsion, or braking control assemblies being controlled in response to the driver's inputs commands.

In particular, an embodiment of the eModule includes a steering control assembly having a steering motor and a pair of steering controllers, with the pair of steering controllers forming a respective first and second printed circuit board assembly (PCBA) each operable to control the steering motor in response to control signals from the master controller. The eModule also includes a mounting bracket positioned with respect to the steering control assembly, and having a mounting feature that is configured to connect to the chassis. A propulsion control assembly of the eModule includes a propulsion controller as a third PCBA that is in communication with the propulsion-braking module. A brake controller is in communication with the propulsion-braking module, with the brake controller forming a fourth PCBA. Some eModules may have less than the full complement of functions, e.g., with propulsion provided in only some eModules while others freewheel.

The eModule may further include a housing that rotates with respect to a steering axis. The housing includes an upper portion positioned adjacent to the mounting bracket and containing the propulsion control assembly, and a lower portion which contains the brake controller. A lower control arm is connected to the lower portion of the housing, and contains a suspension system having an encoder assembly. The encoder assembly is operable to measure a pivot angle of the lower control arm with respect to a wheel pivot axis, with the lower control arm being connectable to the drive wheel via a wheel input/output block. The steering controllers, the propulsion controller, and the brake controller are in communication with each other and the master controller, and are responsive to commands from the master controller to thereby control respective steering, propulsion, and braking functions of the eModule.

In another embodiment, the eModule includes a housing, a lower control arm connected to the housing, and a steering control assembly positioned with respect to the housing, and having a pair of steering controllers and a steering motor. The steering motor includes an encoder read disc having a pair of encoder read heads each outputting a steering angle to a respective one of the pair of steering controllers, a rotor, and a dual-wound stator. The dual-wound stator includes first and second stator windings, and the pair of steering controllers includes a respective first and second PCBA operable to control a rotation of the rotor via a respective one of the first and second stator windings. The redundancy of this design is intended to provide a more fault tolerant operation.

In this embodiment, the eModule further includes a propulsion controller positioned within the housing that includes a third PCBA, with the propulsion controller communicating with a propulsion-braking module located within a drive wheel of a vehicle. A brake controller is also positioned within the housing and likewise configured to communicate with the propulsion-braking module, with the brake controller including a fourth PCBA. A suspension system is disposed within the lower control arm which includes an encoder assembly which measures and outputs a pivot angle of the lower control arm. The steering motor rotates the eModule with respect to a steering axis in response to commands from a master controller to the steering controllers, and the steering controllers, the propulsion controller, and the brake controller control a respective steering, propulsion, and braking function of the eModule.

The above features and advantages and other features and advantages of the present teachings are readily apparent from the following detailed description of the best modes for carrying out the present teachings when taken in connection with the accompanying drawings.

DETAILED DESCRIPTION

Figure 1:
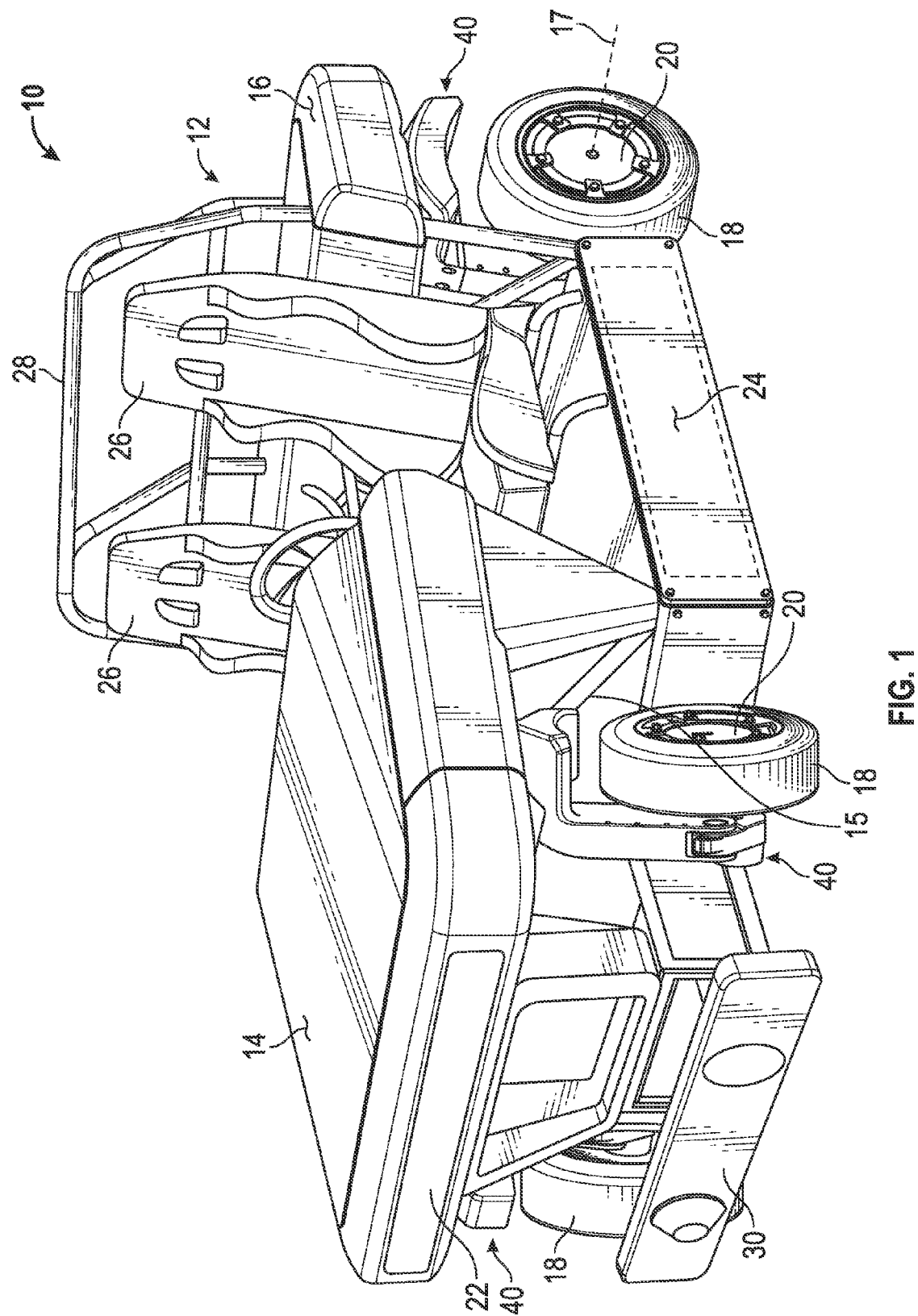
FIG. 1 is a schematic perspective side view illustration of an example modular robotic vehicle having multi-functional electric modules or eModules.
Figure 2:
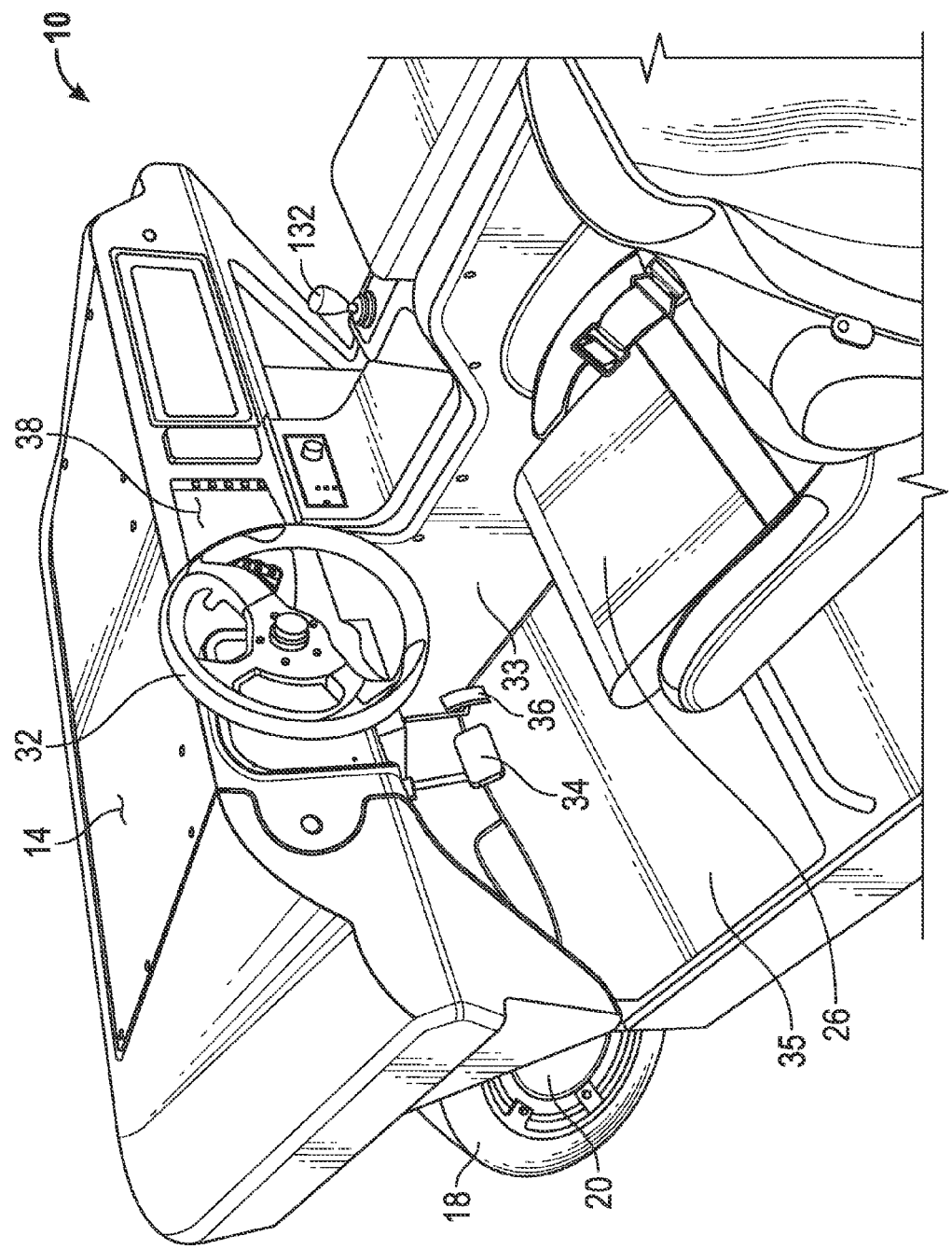
FIG. 2 is a schematic perspective top view illustration of the example modular robotic vehicle shown in FIG. 1.
Figure 3:
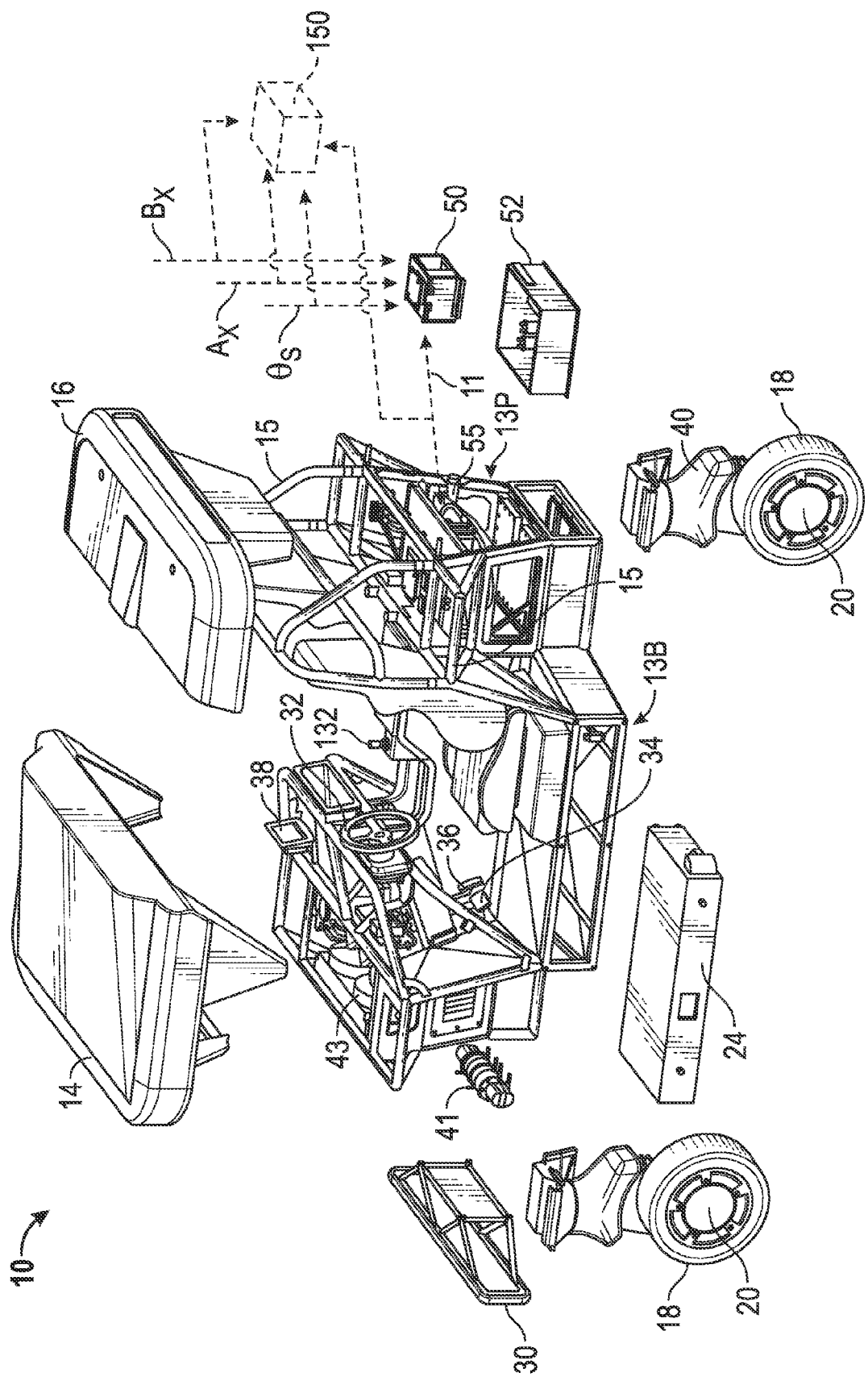
FIG. 3 is a schematic exploded perspective view illustration of the modular robotic vehicle shown in FIGS. 1 and 2.

Referring to the drawings, wherein like reference numbers refer to like components throughout the several Figures, an example vehicle 10 is shown schematically in FIGS. 1-3. The vehicle 10 includes one or more multi-functional electric modules or "eModules" 40, three of which are visible from the perspective of FIG. 1. The vehicle 10 is an example of the type of design with which the eModules 40 may be of particular utility. However, the eModules 40 described herein may be used with other vehicles or mobile platforms, whether operated by a human driver or autonomously controlled via onboard logic or remote control. More or fewer eModules 40 may be used than are shown in the example contained in the various Figures. For example, the vehicle 10 may be any rectangular, triangular, polygon-shaped, pod-shaped, or circular vehicle, used conventionally on roads or highways or in alternative configurations such as a go-kart, an amusement park ride or vehicle, a remote controlled vehicle, a neighborhood vehicle, a golf cart, a maintenance vehicle such as a lawn tractor or mower, a logistical vehicle for use in a plant environment, etc.

A particular modular component providing a foundation to the design set forth herein is a modular electric assembly or "eModule" 40, with eModules 40 being distributed about the vehicle 10, for instance at each corner of a conventional rectangular chassis, or offset from the corners, or arranged around an alternatively shaped chassis, e.g., for an amusement park ride or a circular vehicle. For illustrative consistency, the vehicle 10 of FIG. 1 will be described hereinafter as an example application for the eModules 40, without in any way limiting the eModules 40 to such an application.

Each eModule 40 described herein contains structure which performs the steering, propulsion, and braking control as well as the suspension of a given drive wheel 18 or "corner" of the vehicle. A typical four-wheel vehicle design thus has four eModules 40. The various structural elements used to provide such functionality is described below with reference to FIGS. 4 and 6-8. The eModules 40, as with all components of the vehicle 10, are driven solely via electrical power, e.g., from a high-voltage energy storage system (ESS) 24, whether directly or via an inverted or regulated DC or multi-phase voltage output originating with the storage energy within the ESS 24.

Overall control supervision of the various eModules 40 may be provided via a master controller 50 (see FIG. 3). The master controller 50 may be embodied as a microprocessor-based computer device having sufficient amounts of tangible, non-transitory memory, e.g., read only memory (ROM), as well as transitory memory such as random access memory (RAM), electrically-programmable read-only memory (EPROM), etc. The master controller 50 may also include logic circuitry including but not limited to proportional-integral-derivative (PID) control logic, a high-speed clock, analog-to-digital (A/D) circuitry, digital-to-analog (D/A) circuitry, digital signal processor hardware, and any necessary input/output (I/O) devices and other signal conditioning and/or buffer circuitry. Control functions described herein may be recorded in computer-readable formats in a location accessible by the master controller 50, and executed from such memory in response to changing driver inputs and other conditions such as vehicle speed, battery state of charge, and the like.

The example vehicle 10 of FIG. 1, or any other platform with which the eModules 40 are used, may include a chassis 12 formed from a lattice of interconnected tubular frame pieces 15 (see FIG. 3), e.g., steel, aluminum, or fiberglass tubing. The structure of the chassis 12 helps secure the eModules 40, with an example of such structure being described in more detail below with reference to FIG. 5. A front and a rear body shell 14 and 16, respectively, can be attached to the chassis 12 to form a complete vehicle body as shown. Optional vehicle accessories may include a headlamp 22, seats 26, and/or an overhead bar 28 or other overhead support structure such as a roof or a canopy (not shown). A bumper 30 may be positioned at the front and rear of the vehicle 10 and constructed of impact-resistant plastic, rubber, or another suitable material, with the rear bumper omitted from FIGS. 1 and 3 for illustrative simplicity.

Further with respect to FIG. 1, the vehicle 10 includes a set of drive wheels 18. Each drive wheel 18 is mechanically and electrically attached to a corresponding eModule 40. Additionally, each drive wheel 18 is individually powered by a corresponding propulsion-braking module 20 contained within a hub or center structure of the drive wheel 18 as shown. The propulsion-braking module 20 is rotatably supported by the wheel rim (not shown) for rotation with respect to a wheel axis 17.

While omitted from the Figures for simplicity, each propulsion-braking module 20 may include a propulsion system and a braking system that are independently controlled from within a corresponding eModule 40. For instance, a rotor of an electric wheel motor of the type known in the art may rotate a given drive wheel 18 with respect to the wheel axis 17. A stator of such a motor, e.g., one disposed radially inside of the rotor relative to the wheel axis 17, may be selectively energized via the ESS 24 in response to commands from the master controller 50, as routed via the eModule 40, to oppose a magnetic field of the rotor and thereby cause the drive wheel 18 to rotate. A brake drum with a pair of diametrically-opposed, motor-actuated brake shoes, each of which includes a friction surface, may be used to engage a radial inner surface of the brake drum. An electric brake motor, also omitted for simplicity, may be used to move the brake shoes into engagement with the brake drum when braking is commanded by a driver of the vehicle 10.

Referring to FIG. 2, the eModules 40 of the vehicle 10 are individually controlled in response to driver commands received by multiple driver input devices. The driver input devices collectively determine a driver's desired control response, and in turn provide associated control signals to the master controller 50, which is shown in FIGS. 1 and 3, for the purpose of establishing reliable, fault-tolerant by-wire control of all steering, propulsion, and braking functions provided by the individual eModules 40.

An optional center console 33 may divide the driver side of the passenger compartment from the passenger side in the conventional manner. On the driver side of the center console 33, the driver input devices may include a steering wheel 32 and/or an optional joystick 132, an accelerator pedal 34 and a brake pedal 36 positioned with respect to a floor 35, as well as a human-machine interface (HMI) screen 38, e.g., a touch screen operable to receive selections of preferred operating modes or other control settings. Other driver interface devices may be envisioned without departing from the intended inventive scope. In some embodiments, the functions of the steering wheel 32 and of the respective accelerator and brake pedals 34 and 36 may be performed manually or autonomously/remotely via the joystick 132.

Referring to FIG. 3, the example vehicle 10 is shown in exploded view to illustrate some of the components noted above. Sensors (not shown) may be positioned with respect to the accelerator and brake pedals 34 and 36, respectively, and used to measure the amount of travel and/or force as corresponding accelerator pedal signals ($A_X$) and brake pedal signals ($B_X$). Similarly, a steering angle sensor may be positioned with respect to the steering wheel 32 and used to measure a desired steering angle ($\theta_S$). Calculated changes in the measured steering angle over time, e.g., calculated via the master controller 50, may determine the steering rate ($\omega_S$).

Other control signals (arrow 11), for instance a selected operating mode from the HMI screen 38 and/or heating, ventilation, and air conditioning (HVAC) settings, as well as the various signals $A_X$, $B_X$, $\theta_S$, and $\omega_S$ (not shown), are communicated to or calculated by the master controller 50, which ultimately coordinates all control actions of the various eModules 40. For functional redundancy, a secondary master controller 150 may be used in conjunction with the master controller 50, with the secondary master controller 150 receiving the same set of signals as the master controller 50. The secondary master controller 150 may operate in parallel with the master controller 50 in a stand-by mode. In the event of an unexpected logic fault in the master controller 50, the secondary master controller 150 can immediately assume management responsibilities from the master controller 50 of the core control functionality of the vehicle 10.

The chassis 12 noted above with reference to FIG. 1 may define multiple cavities within which various components are received and contained. For example, the ESS 24 may be inserted below the floor 35 of FIG. 2 into a battery cavity 13B. Similarly, a power electronics module (PEM) 52, which may provide voltage regulation, energy conversion, and power flow regulation functionality aboard the vehicle 10, may be received in a separate power module cavity 13P. Other subsystems or modules may include a coolant pump 41 for circulating coolant to a radiator 43, and/or to each of the eModules 40 for cooling of motor components located therein.

Required electrical energy aboard the vehicle 10 may be supplied by the ESS 24. When the vehicle 10 is not in use, the ESS 24 may be selectively connected to an offboard power supply via a charging port 55 for recharging. Thus, the eModules 40 may be used in battery electric vehicles (BEVs) controlled solely by-wire as noted above, with the available drive and steering modes being electric vehicle (EV) mode variants.

Figure 4:
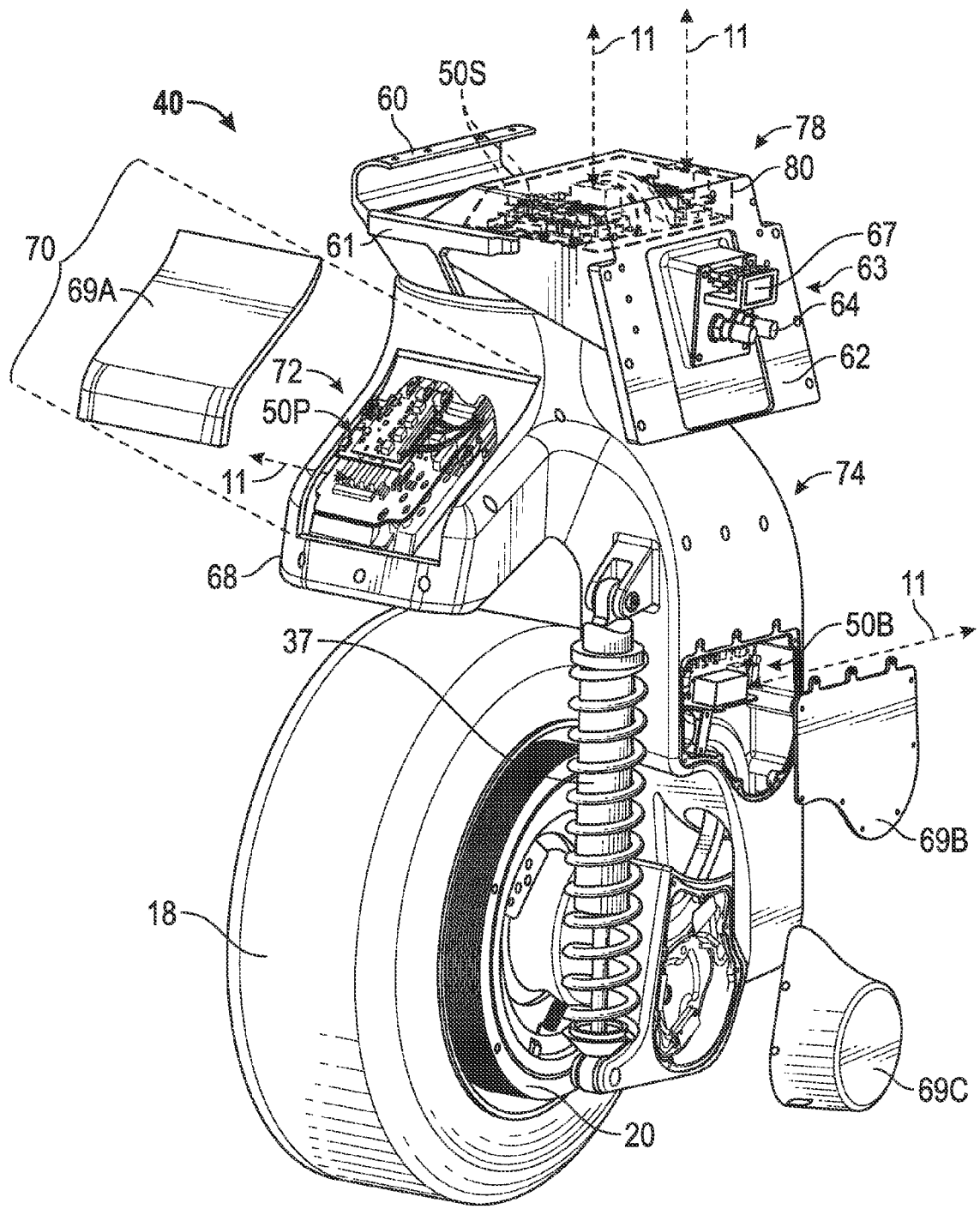
FIG. 4 is a schematic perspective side view illustration of an eModule that is usable with the modular robotic vehicle shown in FIGS. 1-3.

Referring to FIG. 4, each of the eModules 40 are configured to house multiple embedded local controllers used for propulsion, steering, and braking control of a particular corner of the vehicle 10, and each responsive to control signals (arrows 11) from the master controller 50. The embedded local controllers may include a propulsion controller 50P, steering controllers 50S, and a brake controller 50B, each of which may be embodied as a printed circuit board assembly (PCBA) or multiple such PCBAs. Each PCBA may include power switching elements such as IGBTs or MOSFETs such that power inversion may be distributed to the embedded local controllers 50P, 50S, 50P, e.g., when any motors used at the eModules 40 are brushless DC devices.

To serve this function, the eModule 40 is provided with a housing 68 having an upper portion 70 and a lower portion 74. The upper portion 70 may contain a propulsion control assembly 72 containing the propulsion controller 50P and associated control elements, e.g., cooling plates, capacitor banks, wiring, etc. The lower portion 74 may contain elements of a suspension system 76 having a spring-damper assembly 37, with the suspension system 76 described in more detail below with reference to FIG. 6.

The eModule 40 shown in FIG. 4 also includes a steering control assembly 80 which contains the two steering controllers 50S. The steering controllers 50 locally control the steering function of the particular eModule 40 within which they are contained. The use of separate steering controllers 50S and separate windings W1 and W2 (see FIG. 7) provides another level of functional redundancy, in this case over the steering function. A removable upper bracket 78 contains or covers and protects the steering control assembly 80. The upper portion 70 may include a removable access cover 69A which provides direct access to the propulsion controller 50P. Likewise, the lower portion 74 may include a removable access cover 69B providing access to the brake controller 50B. Another removable access cover 69C provides access to elements of the suspension system 76 adjacent to the drive wheel 18 and the propulsion-braking module 20 contained therein.

Figure 5:
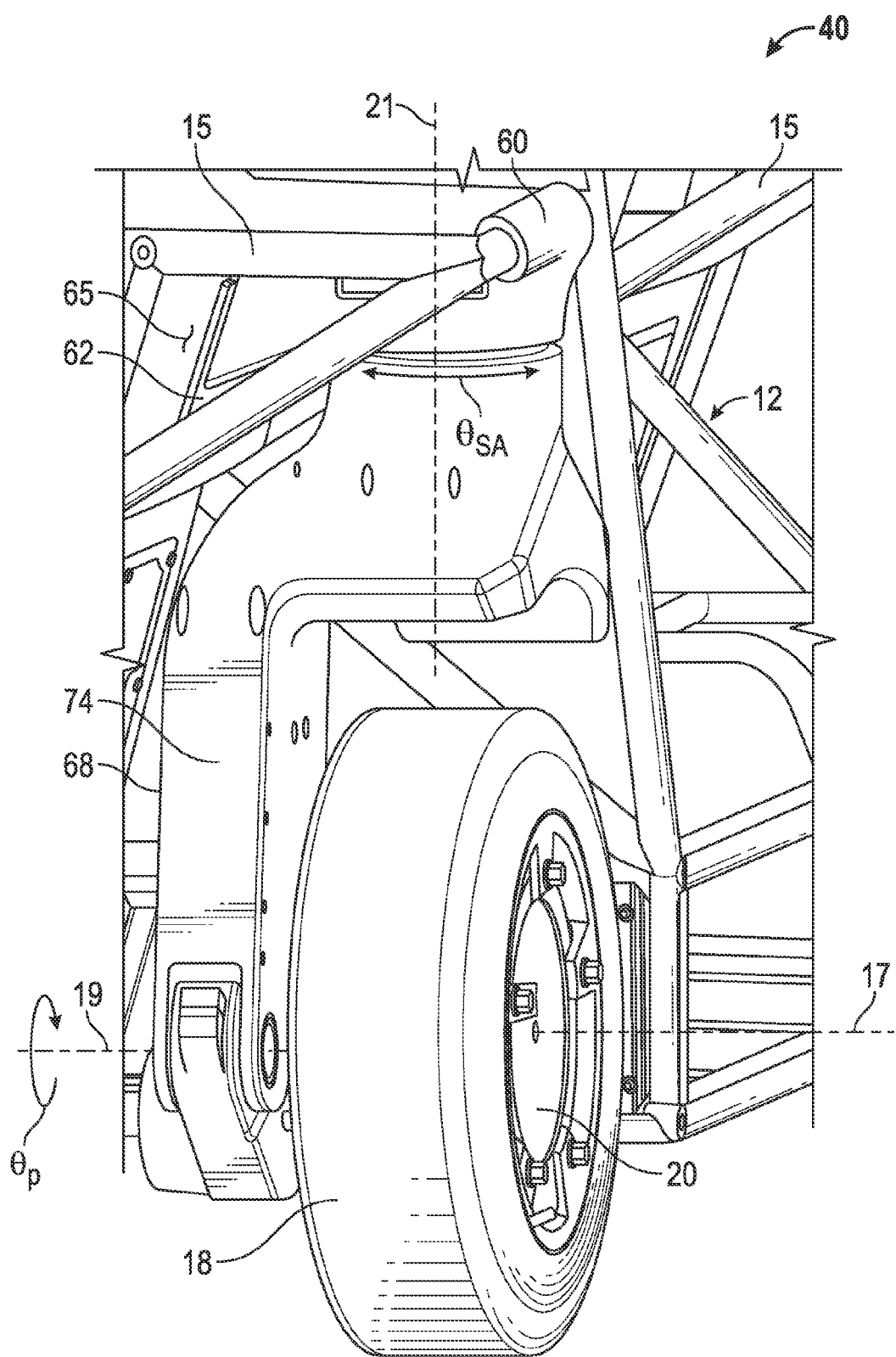
FIG. 5 is a schematic perspective front view illustration of the eModule of FIG. 4 in an installed position.

With respect to the upper bracket 78, this structural element also facilitates connection and disconnection of the eModule 40 to and from the chassis 12 of FIG. 1, with a possible connection configuration shown in FIG. 5. To mount the eModule 40 to the chassis 12, a mounting feature 60, such as an elongated C-shaped mounting channel as shown, may be engaged with a tubular cross piece 15 of the chassis 12 of FIG.

1, and to thereby receive the tubular cross piece 15 and thus help orient and hang the eModule 40. The eModule 40 is then bolted via a rectangular top flange 61 to the chassis 12 via the upper bracket 78.

The upper bracket 78 shown in FIG. 4 may also include an angled bracket 62 positioned opposite to and sloping away from the mounting feature 60. The angled bracket 62 may frame and support a main input/output (I/O) connector block 63 from which fluid I/O connectors 64 and electrical/data I/O connectors 67 protrude. The main I/O connector block 63 thus enables the individual eModules 40 to be quickly connected to all power flow, communications data links, and cooling fluid housed within the chassis 12 of the vehicle 10 shown in FIGS. 1-3. Control signals (arrows 11) may be transmitted over high-speed network connections by the embedded local controllers 50P, 50S, and 50B to the master controller 50 of FIG. 3.

Transmission of the control signals (arrows 11) is shown schematically in FIG. 4 for simplicity. In some embodiments, the embedded local controllers 50P, 50S, and 50B may be daisy-chained together, such that each local embedded controller 50P, 50S, and 50B is apprised of the control status and measurements taken by each of the other local embedded controllers 50P, 50S, and 50B. The master controller 50 in such embodiments would still arbitrate all propulsion, steering, and braking control actions taken at the various eModules 40.

Referring briefly to FIG. 5, an eModule 40 is shown in an installed position. The angled bracket 62 mates up with an angled mounting panel 65 of the chassis 12, and is thereafter bolted to the angled mounting panel 65. Modular installation of the eModule 40 thus works by positioning the mounting feature 60 over a tubular frame piece 15, hanging the eModule 40 via the mounting feature 60, and then completing the structural connection using a series of bolts (not shown). Thereafter, fluid power, electrical power, and data communications to the eModule 40 are connected at the main I/O connection block 63 of FIG. 4.

When properly installed, the eModule 40 of FIG. 5 has three primary axes: the wheel axis 17 noted above, a wheel pivot axis 19, and a steering axis 21 extending longitudinally with respect to the lower portion 74 of the housing 68. The drive wheel 18 rotates with respect to the wheel axis 17, while the mounted eModule 40 rotates through an actual steering angle range indicated by double-headed arrow $\theta_{SA}$. The drive wheel 18 is also allowed to pivot with respect to axis 19 at a pivot angle ($\theta_P$) to help absorb shock and road vibration.

Figure 6:
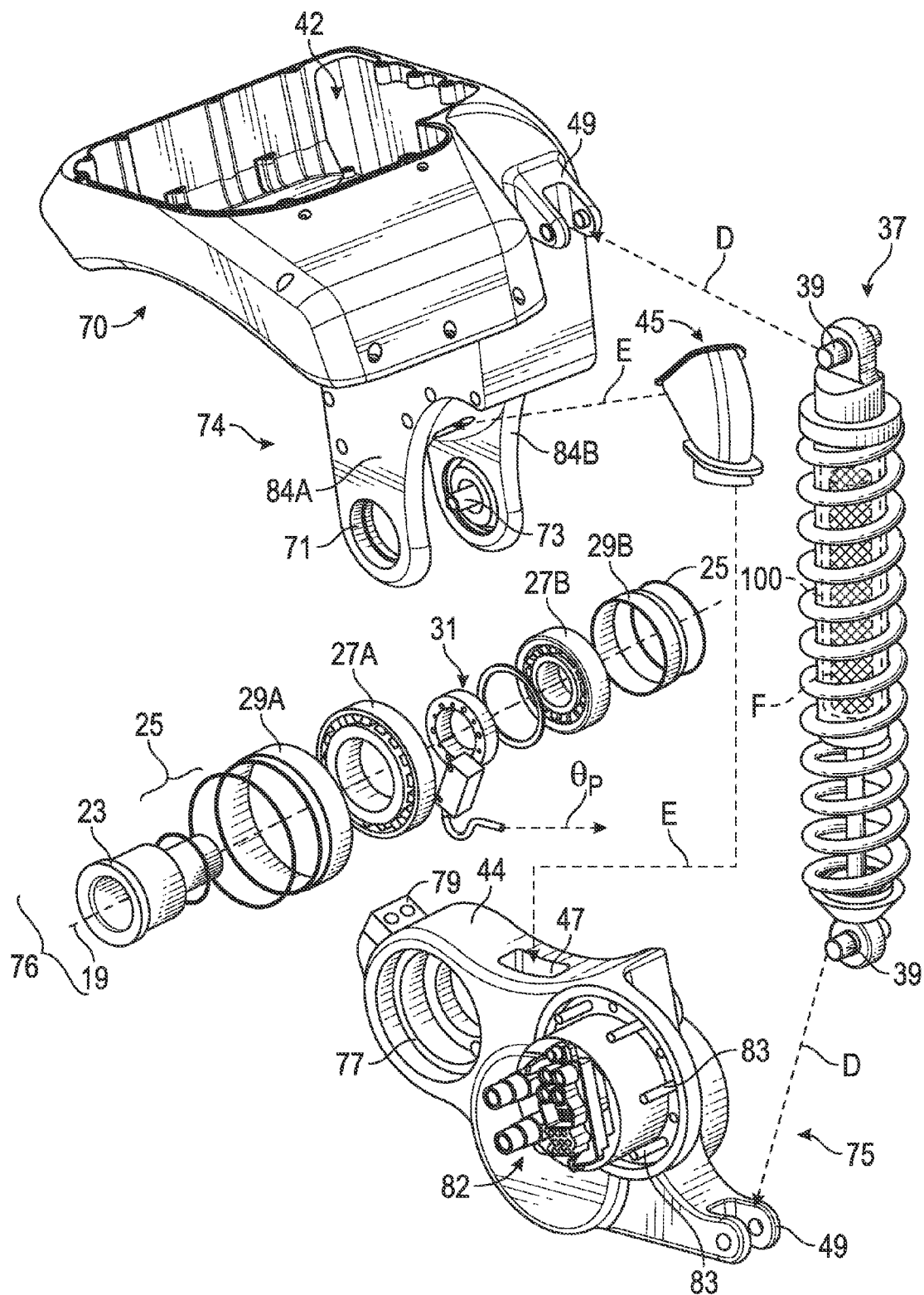
FIG. 6 is a schematic exploded perspective view illustration of the eModule shown in FIGS. 4 and 5.

Referring to FIG. 6, the suspension system 76 is shown in exploded view relative to the upper portion 70 and a lower control arm 75. The upper portion 70 defines a steering interface 42 to the steering control assembly 80 of FIG. 7, while the lower control arm 75 forms an interface between the eModule 40 and the propulsion-braking module 20 (see FIGS. 1-5). The steering interface 42 is visible from the perspective shown, with the steering control assembly 80 of FIG. 8 contained at this location.

Active suspension may be used in an optional embodiment to further optimize the suspension control of each eModule 40. In a possible embodiment, the spring-damper assembly 37 may include magnetorheological (MR) fluid or electrorheological (ER) fluid. As is well known in the art, MR/ER fluids (F) can change stiffness in the response to an introduced magnetic or electric field, as indicated by the dotted lines in FIG. 6, e.g., from a field generator 100 positioned with respect to the fluid, such as a set of coils. Selective application of the field to the MR or ER fluid (F) can change the suspension stiffness of the spring-damper assembly 37 in this non-limiting example embodiment.

All wiring, fluid, and data connections pass from the upper portion 70 to the lower control arm 75 via a harness bellow 45, e.g., a plastic boot extending between the upper portion 70 and an opening 47 in the control arm 75, as indicated by arrows E. The upper portion 70 is connected to or formed integrally with the lower portion 74, with the lower portion 74 defining a pair of arms 84A, 84B extending from the lower portion toward the lower control arm 75. The arm 84A defines a pivot bore 71. Opposite the pivot bore 71, the arm 84B defines a pivot post 73 which receives a pivot shaft 23. The suspension system 76, other than the spring-damper assembly 37, is arranged along the pivot axis 19 between the pivot bore 71 of arm 84A and the post 73 of arm 84B.

Various annular components of the suspension system 76 include a set of o-ring seals 25, bearings 27A and 27B, and an encoder assembly 31, the latter of which measures and outputs the pivot angle ($\theta_P$) to the master controller 50. Shims 29A and 29B may be disposed axially outward from the bearings 27A and 27B with respect to the pivot axis 19 to preload the bearings 27A and 27B. The suspension system 76, with the exception of the spring-damper assembly 37, is then disposed within an arm bore 77 defined by an end 44 of the lower control arm 75, with the end 44 thereafter received between the arms 84A and 84B. The spring-damper assembly 37 is then connected to the upper portion 70 and the control arm 75, e.g., by inserting pins 39 of the spring-damper assembly 37 into mating anchors 49 on the upper portion 70 and the lower control arm 75, as indicated by arrows D. An example installed position of the spring and damper assembly 37 is shown in FIG. 4.

Within the suspension system 76 of FIG. 6, the pivot angle ($\theta_P$) transmitted to the master controller 50 of FIG. 3 may be used as sensory feedback in the overall control of the eModule 40, e.g., for braking or load leveling control actions. A bump stop 79 may be positioned on the lower control arm 75 at the end 44 to provide a hard stop limiting a range of motion of the lower control arm 75 with respect to the pivot axis 19. The lower control arm 75 is then connected to the propulsion-braking module 20 of FIGS. 1-5 via a wheel input/output (I/O) block 82, which provides all required connections for fluid, electrical energy, and data/communications needed to control propulsion and braking for the eModule 40. A ring of bolts 83 on the lower control arm 75 allows the lower control arm 75 to support the weight of the drive wheel 18.

Figure 7:
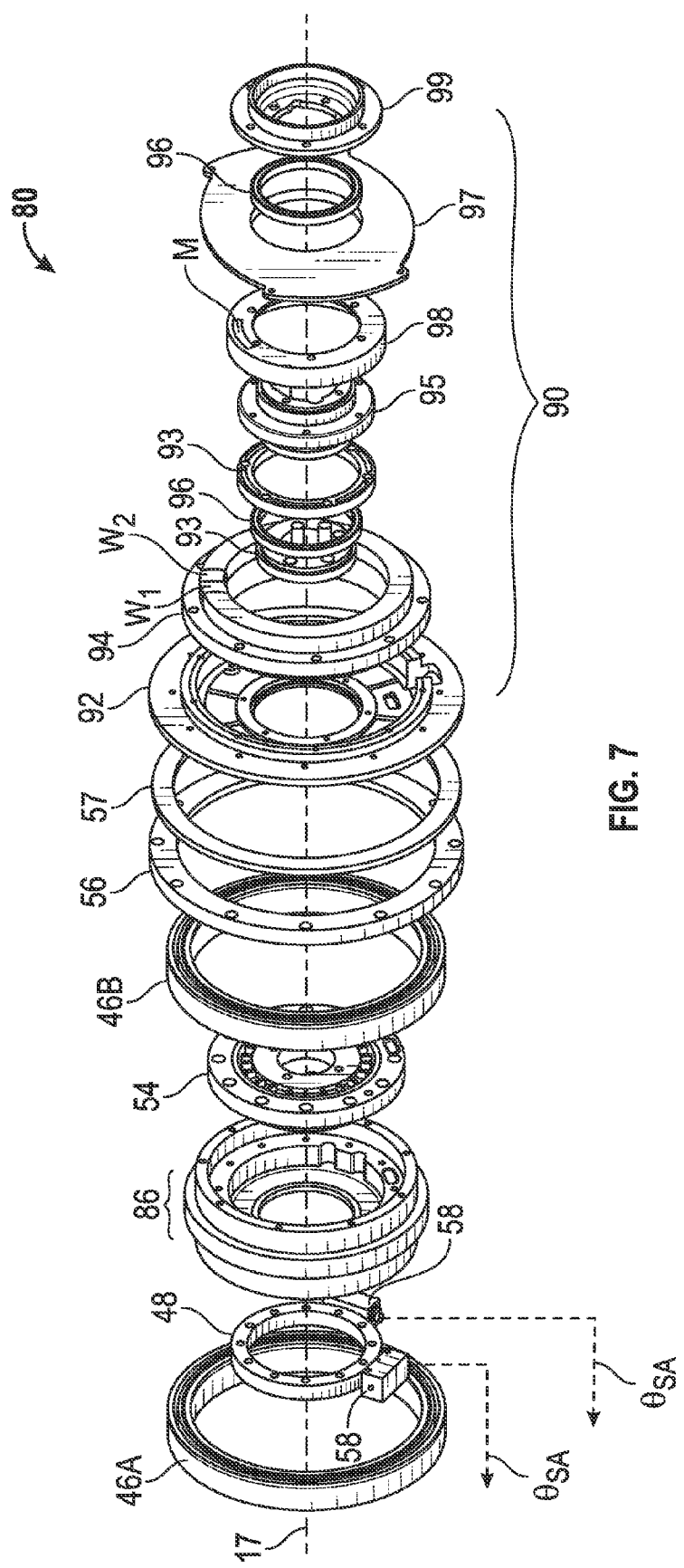
FIG. 7 is a schematic exploded perspective view illustration of an example steering motor assembly usable with the eModule shown in FIGS. 4-6.

Referring to FIG. 7, the steering control assembly 80 includes a series of annular components arranged along the steering axis 17. As viewed from left to right in FIG. 7, a lower support bearing 46A rests within the steering interface 42 of FIG. 6, with the remaining components of the stack up extending axially toward the upper housing 78 shown in the same Figure. An encoder read disc 48 includes two encoder read heads 58, e.g., Hall effect sensors, optical encoders, resolvers, etc., each of which measures and outputs the steering angle (arrow $\theta_{SA}$) to a corresponding one of the steering controllers 50S of FIG. 4.

A steering hub 86 may be positioned adjacent to the encoder read disc 48 and to a speed reducing gear set 54. In one possible embodiment, the speed reducing gear set 54 shown in FIG. 7 provides a steering speed reduction ratio of at least 50:1. In another embodiment, the reduction may be at least 100:1, e.g., reducing a 2000 RPM steering input speed to a 20 RPM actual steering speed as transmitted to the drive wheel 18. This reduction in turn amplifies steering torque, as will be understood by those of ordinary skill in the art. Such steering reducer devices such as the speed reducing gear set 54 providing the desired gear reduction are commercially available off-the-shelf components, and thus are not further described herein. Other steering reduction ratios may be used without departing from the intended inventive scope.

Still referring to FIG. 7, an upper support bearing 46B is disposed adjacent to the speed reducing gear set 54 as shown. A bearing clamp 56 and seal 57 respectively maintain compression on the bearings 46A, 46B and provide a fluid seal within the steering control assembly 80, with the bearings 46A, 46B helping to support the load of the vehicle 10 of FIG. 1 at a given corner. Any wiring harnesses and liquid hose/tubing routed through the eModule 40 should be designed to tolerate twisting as the eModule 40 may rotate from 0° to 360°.

The seal 57 shown in FIG. 7 seals against a steering motor stack 90. The steering motor stack 90 includes a motor support race 92 and a dual-wound stator 94 having two sets of windings W1 and W2, with only a portion of the windings W1 and W2 shown schematically for illustrative simplicity. The steering motor stack 90 may also include annular motor supports 93 and a pair of motor bearings 96. A motor hub 95 supports a rotor 98, on which are epoxied or otherwise secured a series of permanent magnets (M), only one of which is shown for clarity. The steering motor stack 90 is then secured together via a support plate 97 of aluminum or other suitable material and an outer race 99. Other embodiments of the various supporting elements shown in FIG. 7 may vary with the design. However, to provide functional redundancy to the steering function, the steering control assembly 80 should retain the design of the dual-wound stator 94 and the separate encoder read heads 58.

Figure 8:
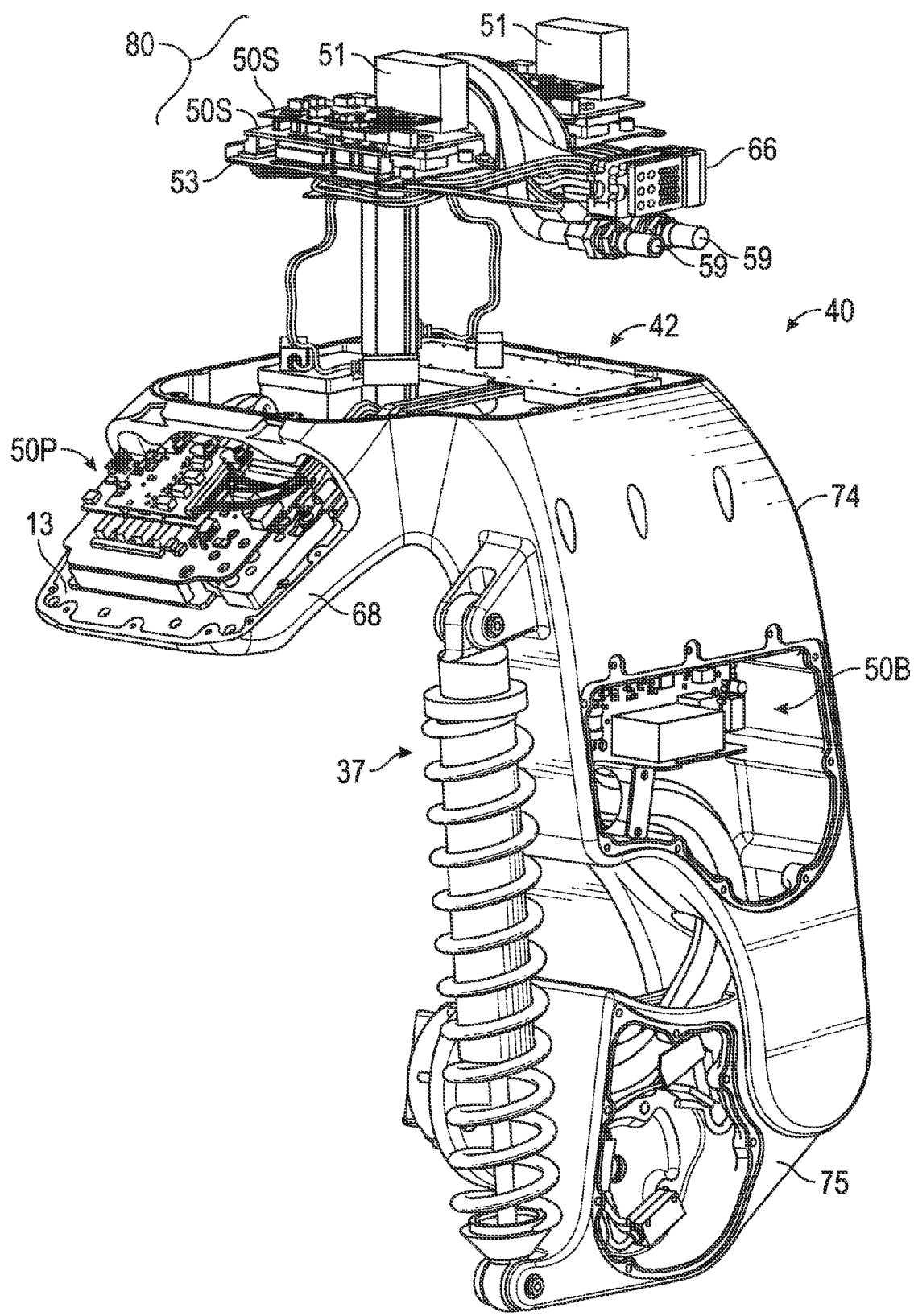
FIG. 8 is another perspective view illustration of the eModule shown in FIGS. 4-7.

Functional redundancy is enabled via the use of the two steering controllers 50S shown in FIGS. 4 and 8. Each steering controller 50S receives the measured steering angle (arrow $\theta_{SA}$) from a corresponding one of the encoder read heads 58. While the dual-wound stator 94 is shown schematically for illustrative clarity, those of ordinary skill in the art will understand that such a device has separately powered parallel windings W1, W2, and thus two poles. Therefore, the steering control assembly 80 of FIG. 7 has one physical steering motor with a single rotor, i.e., the rotor 98. Being a permanent magnet-type device, the rotor 98 should have a very low electrical and mechanical fault tendency. However, the dual-wound stator 94 is electrically energized, and thus the built-in functional redundancy allows the steering motor assembly 80 to function even in the presence of an electrical short or other fault in one of the windings W1 or W2.

That is, under steady state conditions the windings W1 and W2 of the dual-wound stator 94 may be energized via the ESS 24 of FIGS. 1 and 3, with each of the dual windings receiving 50% of the required steering power. Should one of the dual windings experience a fault, the master controller 50 of FIG. 3 can automatically discontinue power transmission to the faulted winding and increase power transmission to the non-faulted winding. While such a control action may result in additional heat generation, the resultant thermal management concerns may be tolerated in the short term to maintain a threshold level of steering functionality.

Referring to FIG. 8, the eModule 40 is shown in perspective view. The access covers 69A-C of FIG. 4 are removed to show the propulsion controller 50P, the brake controller 50B, and the interior of the lower control arm 75. The steering control assembly 80 is positioned with respect to the steering interface 42, with the steering controllers 50S stacked one over the other as shown adjacent to a cooling plate 53. Capacitors 51 may be used at this location to help power the steering controllers 50S. Fluid ports 59 and an electrical/data block 66 can be connected to an onboard fluid supply, electrical transmission, and data transmissions.

Within the housing 68, and cantilevered as shown, the propulsion controller 50P likewise rests on a cooling plate 13. The brake controller 50B is disposed within the lower portion 74 of the housing 68. The packaging configuration represented in FIG. 8 facilitates modular connection of the eModule 40 to and removal from the chassis 12 of FIG. 3 as needed, such as to change a defective eModule 40 or swap out a given eModule 40 with one having a different drive configuration, e.g., one with no internal propulsion motor. The propulsion-braking module 20 of FIGS. 1-5 may be considered part of the eModule 40 in some embodiments, or it may be a separate device that is selectively connected to the control arm 75, with all control structure, electronics, thermal management devices, high-voltage and low-voltage buses, and communication wiring residing within the eModule 40.

Using the eModule 40 design described above, all steering, propulsion, braking, and suspension functions are contained in a removable module which can be attached to the chassis 12 of FIG. 3. In the example vehicle 10 described above, four of the eModules 40 may be used to power a passenger platform, with one eModule 40 per corner. Other embodiments or uses of the eModule 40 may be readily envisioned, including applications requiring as one eModule 40 or any plurality of eModules 40 depending on the task, whether at the corners or offset therefrom, or arranged around the perimeter of the vehicle. In yet other embodiments, some of the eModules 40 may lack certain functions. For instance, the steering, suspension, and/or propulsion structure described above may be omitted from some eModules 40 depending on the application or cost constraints. Likewise, the term "corner" may not apply in some configurations lacking corners, such as a round chassis, or corner placement may not be used, e.g., with offset eModules 40. Other variants may be readily envisioned without departing from the intended inventive scope.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A multi-functional electric module (eModule) for use with a vehicle having a chassis, a master controller, and a drive wheel having a propulsion-braking module, the eModule comprising:
   a steering control assembly having a steering motor and at least one steering controller, wherein each of the at least one steering controller includes a first printed circuit board assembly (PCBA) operable to control the steering motor in response to control signals from the master controller;
   a mounting bracket positioned with respect to the steering control assembly, and having a mounting feature that is engageable with the chassis;
   a propulsion control assembly having a propulsion controller including a second PCBA that is in communication with the propulsion-braking module;
   a brake controller in communication with the propulsion-braking module, wherein the brake controller includes a third PCBA;
   a housing that rotates with respect to the mounting bracket, wherein the housing includes an upper portion positioned adjacent to the mounting bracket and containing the propulsion control assembly, and a lower portion which contains the brake controller; and a lower control arm connected to the lower portion of the housing, wherein the control arm contains a suspension system, and wherein the lower control arm is connectable to the drive wheel via a wheel input/output block;

wherein the pair of steering controllers, the propulsion controller, and the brake controller are in communication with each other and with the master controller, and are responsive to commands from the master controller to thereby control a respective steering, propulsion, and braking function of the eModule.

2. The eModule of claim 1, wherein the at least one steering controller includes a first steering controller having the first PCBA and a second steering controller having a fourth PCBA, the steering motor includes a dual-wound stator having a first winding and a second winding, and a flow of electrical current into each of the first and second windings is respectively controlled by the first and second steering controllers to provide functional redundancy to the steering function.

3. The eModule of claim 1, wherein the steering motor includes a pair of encoder read heads configured to separately measure a steering angle of the steering control assembly, and to relay the separately measured steering angles to a corresponding one of the steering controllers.

4. The eModule of claim 3, wherein the encoder read heads are Hall effect sensors or optical encoders.

5. The eModule of claim 1, wherein the steering control assembly includes a speed reducing gear set which is configured to provide a steering speed reduction ratio of at least 50:1.

6. The eModule of claim 1, wherein the mounting feature is an elongated C-shaped channel.

7. The eModule of claim 1, wherein the suspension system includes an encoder assembly that is operable to measure a pivot angle of the lower control arm with respect to a corresponding one of the drive wheels, and to communicate the measured pivot angle to the master controller.

8. The eModule of claim 7, wherein the lower portion includes a pair of arms extending toward the lower control arm, and wherein the lower control arm includes an end having a bore centered on the wheel pivot axis and positioned between the pair of arms.

9. The eModule of claim 7, wherein an end of the lower control arm includes a bump stop configured to limit a range of motion of the lower control arm with respect to the pivot axis.

10. The eModule of claim 1, wherein the wheel input/output block is configured to route fluid, electricity, and data between the eModule and the propulsion-braking module.

11. The eModule of claim 1, wherein the housing and the lower control arm each define an anchor, the eModule further comprising a spring-damper assembly that extends between the anchors of the housing and the anchors of the lower control arm.

12. The eModule of claim 11, wherein the spring-damper assembly includes one of a magnetorheological fluid and an electrorheological fluid, and also includes a field generator that is configured to change a stiffness of the spring-damper assembly by applying a magnetic or electric field to the respective magnetorheological fluid or electrorheological fluid.

13. A multi-functional electric module (eModule) for use with a vehicle having a chassis, a master controller, and a drive wheel having a propulsion-braking module, the eModule comprising:

a housing;
a lower control arm connected to the housing;
a steering control assembly positioned with respect to the housing, and having a speed reducing gear set that is configured to provide a calibrated steering speed reduction ratio, a pair of steering controllers, and a steering motor, wherein the steering motor includes:
  an encoder read disc having a pair of encoder read heads each outputting a measured steering angle to a respective one of the pair of steering controllers;
  a rotor; and
  a dual-wound stator having first and second stator windings, wherein the pair of steering controllers includes a respective first and a second printed circuit board assembly (PCBA) operable to control a rotation of the rotor via control of an electrical current to a respective one of the first and second stator windings;
a propulsion controller positioned within the housing that includes a third PCBA, wherein the propulsion controller is configured to communicate with the propulsion-braking module;
a brake controller positioned within the housing and configured to communicate with the propulsion-braking module, wherein the brake controller includes a fourth PCBA;
a spring-damper assembly extending between the housing and the lower control arm; and
an encoder assembly disposed within the lower control arm that is configured to measure and communicate, to a master controller, a pivot angle of the lower control arm with respect to a wheel pivot axis of the drive wheel;
wherein the steering motor rotates the eModule with respect to a steering axis in response to commands from the master controller to the pair of steering controllers, and wherein the steering controllers, the propulsion controller, and the brake controller control a respective steering, propulsion, and braking function of the eModule.

14. The eModule of claim 13, wherein the encoder read heads are Hall effect sensors or optical encoders.

15. The eModule of claim 13, wherein the calibrated steering speed reduction ratio is at least 50:1.

16. The eModule of claim 13, further comprising a mounting bracket attached to the housing, wherein the mounting bracket defines an elongated C-shaped channel that is engageable with the chassis.

17. The eModule of claim 13, wherein the housing defines a pair of arms extending toward the lower control arm, and wherein the lower control arm includes an end having a bore centered on the pivot axis and positioned between the pair of arms.

18. The eModule of claim 17, wherein an end of the lower control arm includes a bump stop configured to limit a range of motion of the lower control arm with respect to the pivot axis.

19. The eModule of claim 17, wherein the spring-damper assembly includes one of a magnetorheological fluid and an electrorheological fluid, and also includes a field generator that is configured to change a stiffness of the spring-damper assembly by applying a magnetic or electric field to the respective magnetorheological fluid or electrorheological fluid.

* * * * *